(12) United States Patent
Ito et al.

(10) Patent No.: US 7,873,971 B2
(45) Date of Patent: Jan. 18, 2011

(54) MOTOR HAVING CHUCKING DEVICE AND DISK DRIVING APPARATUS INCLUDING SAME

(75) Inventors: Haruhiko Ito, Kyoto (JP); Takuya Yamane, Kyoto (JP); Shigeo Kawamura, Kyoto (JP); Yoshihisa Kitamura, Kyoto (JP)

(73) Assignee: Nidec Corporation, Kyoto (JP)

( * ) Notice: Subject to any disclaimer, the term of this patent is extended or adjusted under 35 U.S.C. 154(b) by 524 days.

(21) Appl. No.: 12/035,958

(22) Filed: Feb. 22, 2008

(65) Prior Publication Data

US 2008/0209454 A1 Aug. 28, 2008

(30) Foreign Application Priority Data

Feb. 23, 2007 (JP) ............................. 2007-043450

(51) Int. Cl.
*G11B 17/04* (2006.01)

(52) U.S. Cl. ...................................... 720/710

(58) Field of Classification Search ................. 720/600, 720/601, 602, 603, 604, 606, 700, 702, 707, 720/709, 710, 712, 713, 715; 310/89, 90.5
See application file for complete search history.

(56) References Cited

U.S. PATENT DOCUMENTS

| | | | |
|---|---|---|---|
| 7,089,569 B2 * | 8/2006 | Matsui et al. ............... | 720/611 |
| 7,493,633 B2 * | 2/2009 | Ikemoto ...................... | 720/707 |
| 2006/0212884 A1 * | 9/2006 | Yang ............................ | 720/619 |
| 2007/0277189 A1 * | 11/2007 | Yasumoto et al. ........... | 720/710 |
| 2008/0046906 A1 * | 2/2008 | Takaki et al. ................ | 720/707 |
| 2008/0235718 A1 * | 9/2008 | Takaki et al. ................ | 720/604 |
| 2008/0278027 A1 * | 11/2008 | Ikemoto et al. ............. | 310/254 |
| 2009/0241140 A1 * | 9/2009 | Takaki et al. ................ | 720/604 |

FOREIGN PATENT DOCUMENTS

| JP | 64-42545 U | 3/1989 |
|---|---|---|
| JP | 05-334779 A | 12/1993 |
| JP | 2000-348426 A | 12/2000 |
| JP | 2001-84684 A | 3/2001 |
| JP | 2002-281724 A | 9/2002 |
| JP | 2003-36584 A | 2/2003 |

* cited by examiner

*Primary Examiner*—Allen T Cao
(74) *Attorney, Agent, or Firm*—Westerman, Hattori, Daniels & Adrian, LLP

(57) ABSTRACT

A motor includes a chucking device to hold a disk having a central opening in a detachable manner. In the chucking device, a turntable part is arranged above a rotor holder and has a disk support surface for supporting the disk. An axially slidable cone part is arranged above the turntable part. A resilient member is axially arranged between the turntable part and the cone part upwardly biases the cone part. Further, the turntable part includes an inner table made of a metal and fixed to the shaft, and an outer table made of a resin material and fixed to an outside of the inner table. The outer table has the disk support surface and is axially spaced apart from the rotor holder in a position where the inner table and the outer table are fixed to each other.

20 Claims, 12 Drawing Sheets

MOTOR HAVING CHUCKING DEVICE AND DISK DRIVING APPARATUS INCLUDING SAME

FIELD OF THE INVENTION

The present invention relates to a motor provided with a chucking device and, more particularly, to a motor capable of preventing deflection of a turntable of a chucking device even when a force is imparted on the turntable. The present invention also pertains to a disk driving apparatus equipped with the motor.

BACKGROUND OF THE INVENTION

Conventionally, a motor for rotating a disk is provided at its top portion with a chucking device that removably holds the disk. The chucking device includes a centering case which brings the center of the disk into alignment with the rotational axis of the motor (hereinafter simply referred to as "centering") and a turntable having a disk support surface for supporting the disk. In general, the chucking device is fastened to a rotating shaft of the motor (see, e.g., Japanese Patent Laid-open Publication No. H5-334779 that discloses a conventional motor provided with a chucking device).

A structure of the conventional motor 1a provided with a chucking device as disclosed in Japanese Patent Laid-open Publication No. H5-334779 will be described with reference to FIG. 12, which is an axially-cut schematic section view of the conventional motor.

Referring to FIG. 12, the motor 1a includes a rotating member that rotates about a specified center axis J1 and a fixed member that rotatably supports the rotating member. A chucking device 2a is attached to the axial top portion of the rotating member. The rotating member has a rotating shaft 1a1 arranged coaxially with the center axis J1. The chucking device 2a includes a resin-made turntable part 2a1 fixedly secured to the shaft 1a1, the turntable part 2a1 having a disk support surface 2a11 for supporting a disk (not shown), and a centering case 2a2 which brings the center of the disk into alignment with the center axis J1.

In keeping with a recent demand for a low-profile disk driving apparatus, there is an increasing need to reduce the thickness of a motor. In a motor provided with a chucking device, the chucking device is made thin in an effort to accomplish thickness reduction of the motor without sacrificing the characteristics thereof.

During the course of fitting a motor to a disk driving apparatus, however, there is a possibility that a worker who engages in the task of assembling the disk driving apparatus may inadvertently press a disk support surface of a chucking device. The turntable part 2a1 may possibly be deformed at this time, because the axial length of a coupling portion between the shaft 1a1 and the turntable part 2a1 cannot be sufficiently obtained due to reduction in the thickness of the chucking device and because the turntable part 2a1 is made of a resin material. As a result, a disk may be deflected during its rotation and an error may possibly be generated when recording information on or reproducing information from the disk. Another problem resides in that vibration may be generated due to deflection of the disk during its rotation.

SUMMARY OF THE INVENTION

The present invention provides a motor with a highly accurate chucking device by which a turntable part of the chucking device is prevented from deformation even if a disk support surface of the chucking device is pressed when mounting the motor within a disk driving apparatus, and also provides a disk driving apparatus equipped with the motor.

In accordance with one aspect of the present invention, there is provided a motor including: a chucking device arranged to hold a disk having a central opening in a detachable manner; a shaft centered on a center axis; a rotor magnet rotatable about the center axis; a rotor holder fixed to the shaft and arranged to hold the rotor magnet; and a stator arranged inside the rotor holder opposite to the rotor magnet.

Further, the chucking device includes: a turntable part arranged above the rotor holder, the turntable part having a disk support surface arranged to support the disk; an axially slidable cone part arranged above the turntable part, the cone part having an annular centering surface which slants axially downwardly and radially outwardly and brings a center of the central opening of the disk into alignment with the center axis; a resilient member axially arranged between the turntable part and the cone part to upwardly bias the cone part; and a movement restricting part arranged above the cone part arranged to restrict upward movement of the cone part, Herein, the turntable part includes an inner table made of a metal and fixed to the shaft, and an outer table made of a resin material and outside of the inner table, the outer table having the disk support surface, and the outer table is spaced apart from the rotor holder in a position where the inner table and the outer table are fixed to each other.

With such configuration, it is possible to highly accurately position the disk support surface with no influence of deflection of the upper surface of the rotor holder by keeping the outer table having the disk support surface spaced apart from the upper surface of the rotor holder. Subsequently, by fixing the rotor holder to the shaft, coaxiality between the center axis and the center of the rotor magnet can be improved. Since the inner table is made of a metal and fixed to the shaft, it is possible to prevent deformation of the fixing portion of the inner table and the shaft, even when an axially acting force is applied to the disk support surface. Also, since the moment generated in the inner table and the outer table becomes smaller than the moment which would be generated when the outer table is fixed to the shaft, it is possible to prevent deformation of the fixing portion of the outer table and the inner table. Therefore, it is possible to reduce rotational deflection of the disk support surface.

In accordance with second aspect of the present invention, there is provided a motor including: a chucking device arranged to hold a disk having a central opening in a detachable manner; a shaft centered on a center axis; a rotor magnet rotatable about the center axis; a rotor holder fixed to the shaft arranged to hold the rotor magnet; a stator arranged inside the rotor holder opposite to the rotor magnet; and an automatic balancing device provided between the chucking device and the rotor holder for automatically correcting a rotating balance of the motor.

Further, the chucking device includes: a turntable part arranged above the rotor holder, the turntable part having a disk support surface arranged to support the disk; an axially slidable cone part arranged above the turntable part, the cone part having an annular centering surface which slants axially downwardly and radially outwardly and brings a center of the central opening of the disk into alignment with the center axis; a resilient member axially arranged between the turntable part and the cone part to upwardly bias the cone part; and a movement restricting part arranged above the cone part arranged to restrict upward movement of the cone part.

Herein, the turntable part includes an inner table made of a metal and fixed to the shaft, and an outer table made of a resin material and fixed to an outside of the inner table, the outer table having the disk support surface and an axially downwardly opened annular groove portion formed in an outer peripheral portion thereof.

The automatic balancing device includes an annular space surrounded by the annular groove portion of the outer table and the upper surface of the rotor holder and a plurality of balancing members received within the annular space, and the outer table is arranged in an axially spaced-apart relationship with the rotor holder in a position where the inner table and the outer table are fixed to each other.

With such configuration, it is possible to highly accurately position the disk support surface with no influence of deflection of the upper surface of the rotor holder by keeping the outer table having the disk support surface spaced apart from the upper surface of the rotor holder. Subsequently, by fixing the rotor holder to the shaft, coaxiality between the center axis and the center of the rotor magnet can be improved. Since the inner table is made of a metal and fixed to the shaft, it is possible to prevent deformation of the fixing portion of the inner table and the shaft, even when an axially acting force is applied to the disk support surface. Also, since the moment generated in the inner table and the outer table becomes smaller than the moment which would be generated when the outer table is fixed to the shaft, it is possible to prevent deformation of the fixing portion of the outer table and the inner table. Therefore, it is possible to reduce rotational deflection of the disk support surface.

In accordance with third aspect of the present invention, there is provided a motor including: a chucking device arranged to hold a disk having a central opening in a detachable manner; a shaft centered on a center axis; a rotor magnet rotatable about the center axis; a rotor holder fixed to the shaft and arranged to hold the rotor magnet; and a stator arranged inside the rotor holder opposite to the rotor magnet.

Further, the chucking device includes: a centering case portion having a centering surface which brings a center of the central opening of the disk into alignment with the center axis; and a turntable part having a disk support surface formed radially outwardly of the centering surface so that a lower surface of the disk can make contact with the disk support surface.

Herein, the turntable part includes an inner table fixed to the shaft and an outer table fixed to the inner table, the outer table having the disk support surface, and the outer table is arranged in an axially spaced-apart relationship with the rotor holder in a position where the inner table and the outer table are fixed to each other.

With such configuration, it is possible to highly accurately position the disk support surface with no influence of deflection of the upper surface of the rotor holder by keeping the outer table having the disk support surface spaced apart from the upper surface of the rotor holder. Subsequently, by fixing the rotor holder to the shaft, coaxiality between the center axis and the center of the rotor magnet can be improved. Since the inner table is made of a metal and fixed to the shaft, it is possible to prevent deformation of the fixing portion of the inner table and the shaft, even when an axially acting force is applied to the disk support surface. Owing to the fact that the moment generated in the inner table and the outer table becomes smaller than the moment which would be generated when the outer table is fixed to the shaft, it is possible to prevent deformation of the fixing portion of the outer table and the inner table. Therefore, it is possible to reduce rotational deflection of the disk support surface.

In accordance with the aspects of the present invention, it is possible to provide a motor with a highly accurate chucking device by which a turntable part of the chucking device is prevented from deformation even if a disk support surface of the chucking device is pressed when mounting the motor within a disk driving apparatus, and also to provide a disk driving apparatus equipped with the motor.

DETAILED DESCRIPTION OF THE PREFERRED EMBODIMENTS

Figure 1:
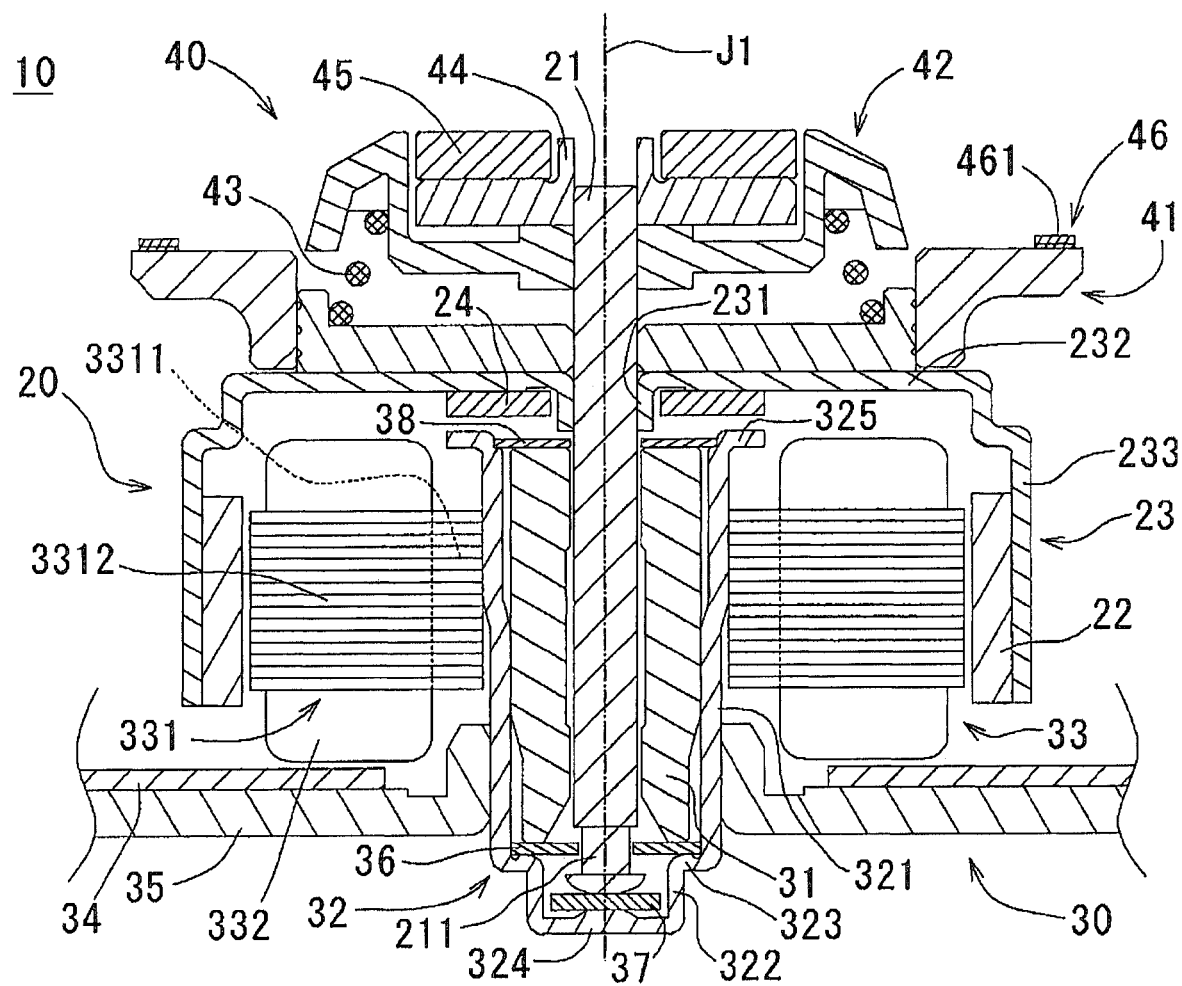
FIG. 1 is an axially-cut schematic section view showing a motor in accordance with one embodiment of the present invention.

Referring to FIGS. 1 through 12, preferred embodiments of the present invention will be described in detail. It should be noted that in the explanation of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel to a rotation axis, and a radial direction indicates a direction perpendicular to the rotation axis.

<Overall Structure of a Motor>

One embodiment of a motor in accordance with the present invention will now be described with reference to FIG. 1, which is an axially-cut schematic section view of the motor.

Referring to FIG. 1, a motor 10 of the present invention includes a rotating body 20 designed to rotate about a specified center axis J1, a fixed body 30 for rotatably supporting the rotating body 20 and a chucking device 40, arranged on an axial top side of the rotating body 20, for detachably holding a disk(not shown) having a central opening.

The rotating body 20 includes a rotating shaft 21 arranged in a coaxial relationship with the center axis J1, a rotor magnet 22 adapted to rotate about the center axis J1 and a rotor holder 23, fixed to the shaft 21, holding the rotor magnet 22 in place.

The rotor holder 23 includes a cylindrical shaft-fixed portion 231 fixed to a circumferential surface of the shaft 21 in such a manner as to extend axially downwardly, a cover portion 232 extending radially outwardly from the shaft-fixed portion 231 at a right angle relative to the center axis J1, and a cylinder portion 233 extending axially downwardly from an outer circumferential edge of the cover portion 232. The rotor magnet 22 is adhesively bonded to an inner circumferential surface of the cylinder portion 233. The rotor holder 23 is produced by press-forming an iron-based thin magnetic steel plate.

The fixed body 30 includes a generally cylindrical sleeve 31 having an inner circumferential surface that radially faces the outer circumferential surface of the shaft 21 through a gap and rotatably supports the shaft 21 radially; a generally cylindrical housing 32 having an inner circumferential surface that makes contact with a limited axial extension of an outer circumferential surface of the sleeve 31; a stator 33 fixed to an outer circumferential surface of the housing 32 for generating a rotating magnetic field; a circuit board 34, disposed lower side of the stator 33 in an axial direction, for controlling rotation of the rotating body 20; and an attachment plate 35, fixed to the outer circumferential surface of the housing 32, having an upper surface to which the circuit board 34 is attached.

The housing 32 includes constructed from a cylindrical holder portion 321 having an inner circumferential surface for holding the outer circumferential surface of the sleeve 31, a reduced diameter portion 322 whose outer diameter is smaller than the outer diameter of the cylindrical holder portion 321, an inner extension portion 323 for joining the cylindrical holder portion 321 and the reduced diameter portion 322, a bottom portion 324 continuously extending from the reduced diameter portion 322 and covering lower side of the reduced diameter portion 322 in an axial direction, and an outer extension portion 325, formed at upper portion of the cylindrical holder portion 321, extending radially outwardly in a ring shape.

An annular removal-proof member 36 is arranged in an axial gap between a lower end surface of the sleeve 31 and an upper surface of the inner extension portion 323. An annular groove portion 211 is formed in the shaft 21 at a position where the shaft 21 radially faces an inner circumferential surface of the removal-proof member 36. A removal-proof mechanism for restricting axial upward movement of the shaft 21 is provided by the removal-proof member 36 having an inner diameter smaller than the outer diameter of a lower portion of the shaft 21 disposed axially below the annular groove portion 211.

A thrust plate 37 is arranged on an upper surface of the bottom portion 324 of the housing 32. The thrust plate 37 is formed into a generally disc-like shape using a resin material with superior slidability and wear resistance. The shaft 21 has a lower end surface resting on an upper surface of the thrust plate 37. The lower end surface of the shaft 21 is formed into a generally hemispherical shape. The thrust plate 37 axially supports the shaft 21 in a rotatable manner.

An oil cutoff washer 38 is arranged on an upper end surface of the sleeve 31. Using a resin material, the oil cutoff washer 38 is formed into a generally annular shape so that it can have inner and outer circumferential surfaces. The outer circumferential surface of the oil cutoff washer 38 is placed on an upper end portion of the cylindrical holder portion 321 of the housing 32.

A annular attracting magnet 24 is fixed to a lower surface of the cover portion 232 of the rotor holder 23 such that it can axially face an upper surface of the outer extension portion 325 of the housing 32.

The stator 33 includes a stator core 331 formed of a plurality of axially layered thin electromagnetic steel plate and a coil 332 formed of a conductive wire wound around the stator core 331. The stator core 331 includes an annular core-back portion 3311 having an inner circumferential surface fixed to the outer circumferential surface of the cylindrical holder portion 321 of the housing 32 and teeth portions 3312 continuously extending from the core-back portion 461 radially outwardly. The teeth portions 3312 are formed in plural numbers in a circumferentially spaced-apart relationship with one another. The coil 332 is formed by winding a conductive wire around the teeth portions 3312 in multiple layers. The teeth portions 3312 have outer circumferential surfaces radially facing the inner circumferential surface of the rotor magnet 22 with a gap left therebetween.

The chucking device 40 is fixed to an upper surface of the cover portion 232 of the rotor holder 23. The chucking device 40 includes a turntable part 41 having a disk support surface 461 that makes contact with a lower surface of a disk, an axially movable cone part 42 for bringing the center of the disk into alignment with the center axis J1, a resilient member 43 for axially upwardly biasing the cone part 42, a movement restricting part 44 for restricting axial upward movement of the cone part 42 by making contact with the cone part 42, and a clamp magnet 45 fixed an upper surface of the movement restricting part 44. A disk support part 46 is fixed to an upper surface of the turntable part 41 of the chucking device 40 and has at the top thereof the disk support surface 461 with which the lower surface of the disk makes contact.

A disk is mounted on the disk support surface 461 of the chucking device 40 and a rotating magnetic field is formed between the rotor magnet 22 and the stator 33 by allowing an electric current to flow through the coil 332 of the stator 33. The rotating body 20 and the chucking device 40 are rotated about the center axis J1, thereby causing the disk to rotate about the center axis J1.

<Structure of the Chucking Device>

Figure 2:
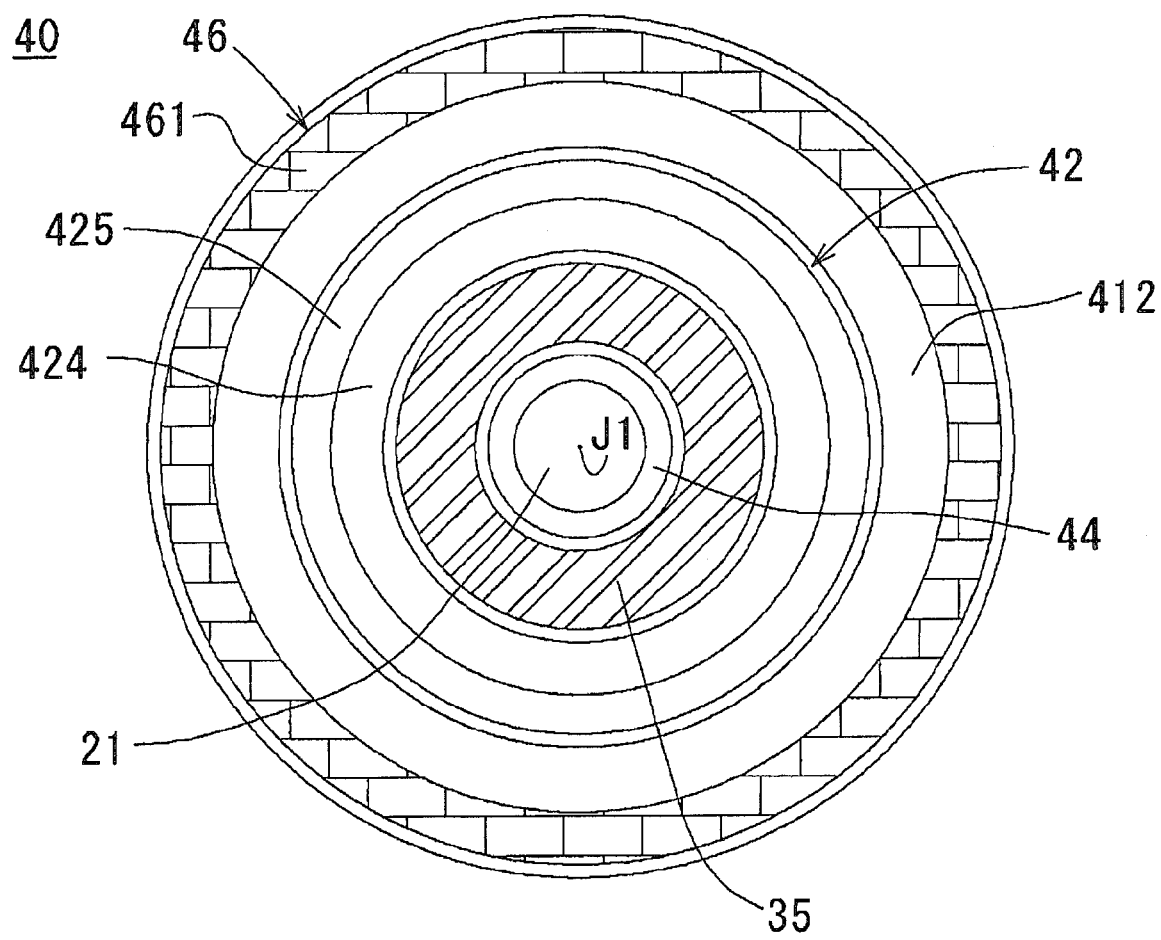
FIG. 2 is a top plan view illustrating a chucking device in accordance with the embodiment of the present invention.
Figure 3:
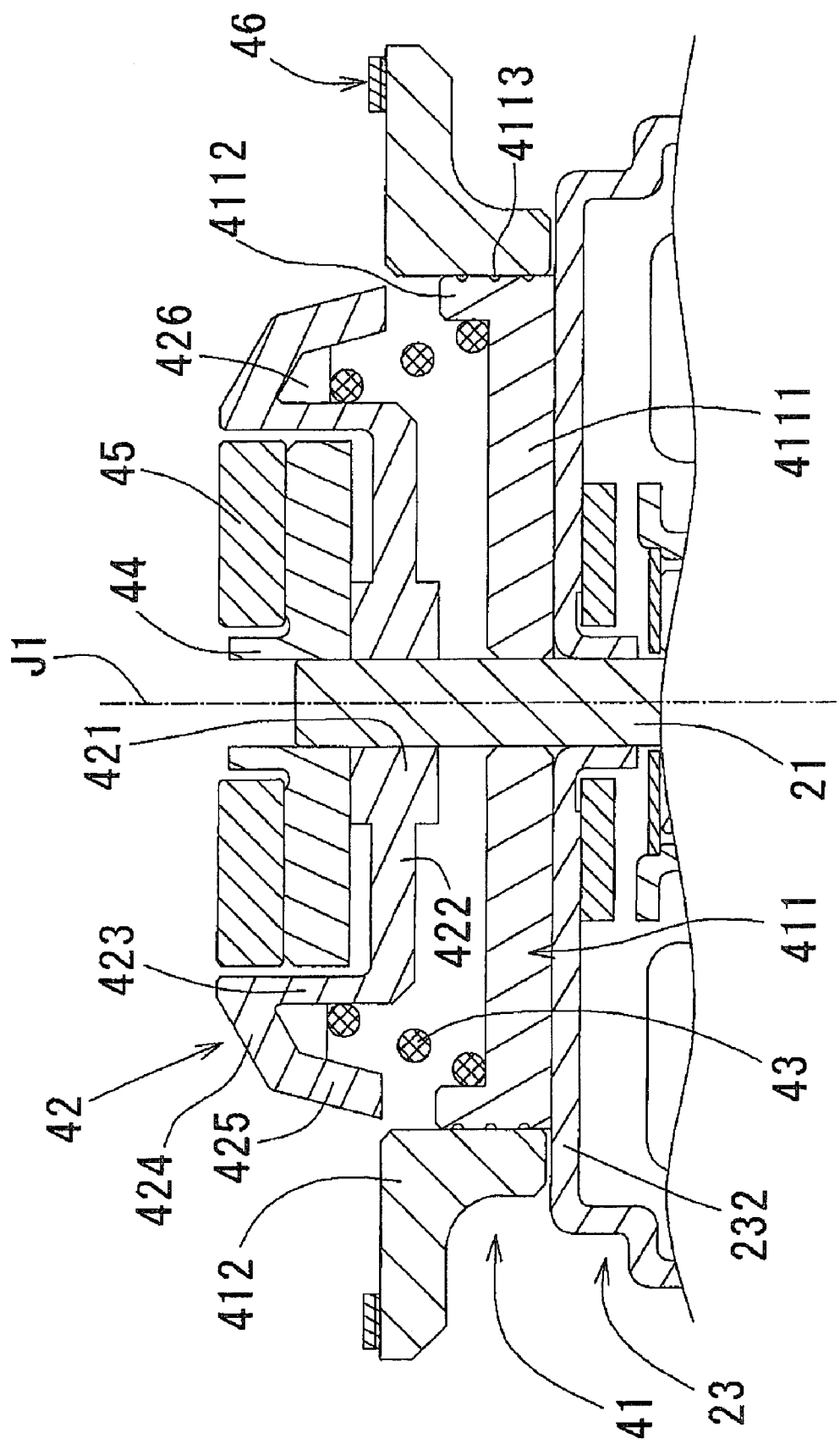
FIG. 3 is an enlarged section view of the chucking device shown in FIG. 1 and its surrounding structure.
Figure 4A:
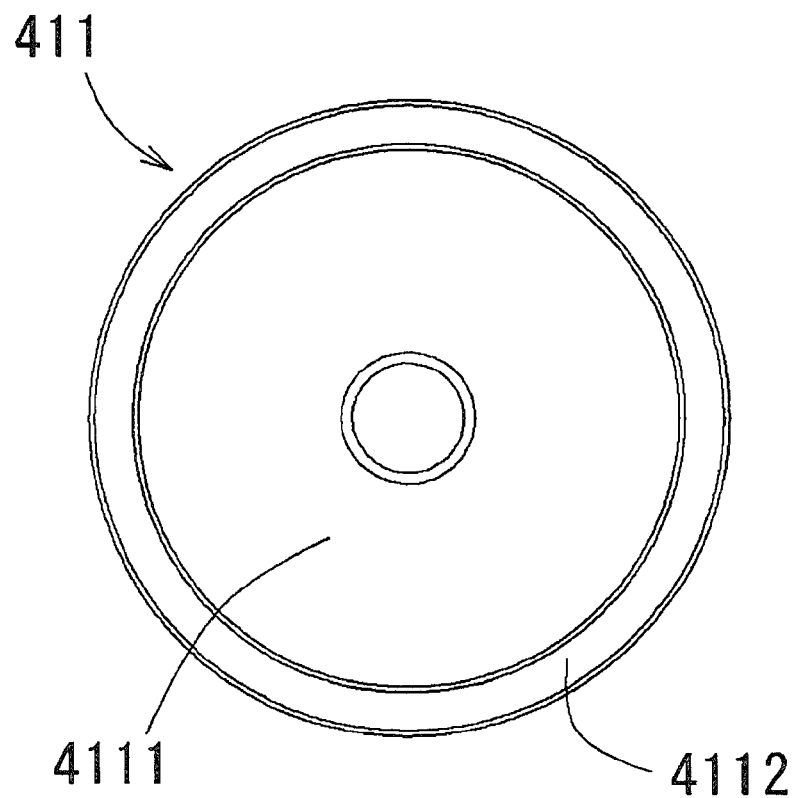
FIG. 4A is a top plan view illustrating an inner table employed in the motor of the present invention and FIG. 4B is an axially-cut schematic section view showing the inner table.
Figure 4B:
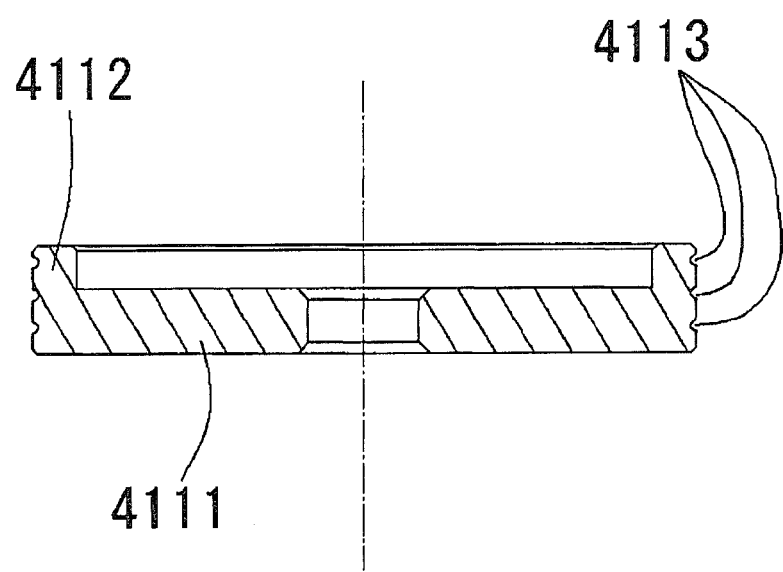
Figure 5A:
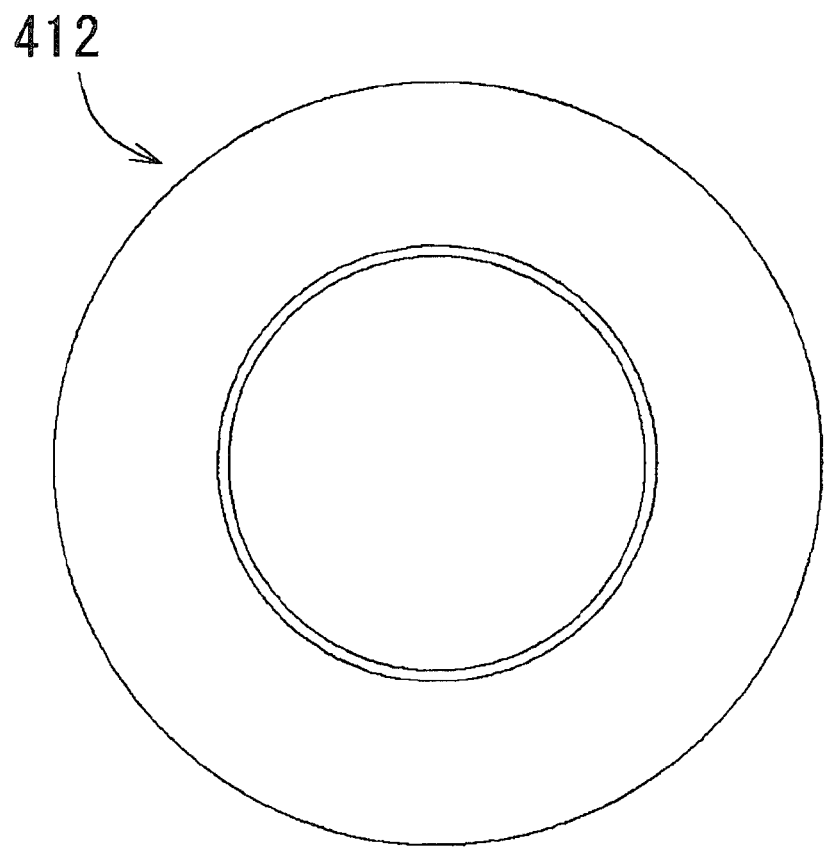
FIG. 5A is a top plan view illustrating an outer table employed in the motor of the present invention and FIG. 5B is an axially-cut schematic section view showing the outer table.
Figure 5B:
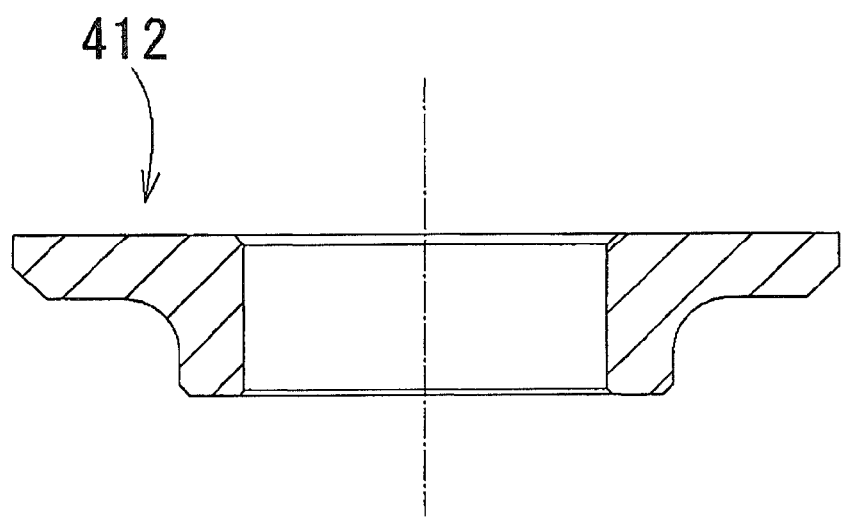

Next, a structure of the chucking device 40 of the present invention will be described with reference to FIGS. 2 to 5. FIG. 2 is a top plan view of the chucking device 40. FIG. 3 is an enlarged section view of the chucking device 40 shown in FIG. 1 and its surrounding structure. FIG. 4A is a top plan view illustrating an inner table 411 and FIG. 4B is an axially-cut schematic section view of the inner table 411. FIG. 5A is a top plan view illustrating an outer table 412 employed in the motor of the present invention and FIG. 5B is an axially-cut schematic section view of the outer table 412.

Referring to FIG. 3, the turntable part 41 includes an inner table 411 made of a metal and fixed to the shaft 21 and an outer table 412 made of a resin material and fixed to a radial outer side of the inner table 411, the outer table 412 having the disk support surface 461.

The inner table 411 is formed by cutting a brass piece as a metal into a generally "cup"-like cross section with an opening at the center of the bottom. Referring to FIG. 4B, the inner table 411 is provided with an inner circumferential surface fixed to the outer circumferential surface of the shaft 21 by a press-fitting method, a base portion 4111 extending radially outwardly from the inner circumferential surface, and an upper extension portion 4112 extending axially upwardly from the base portion 4111. The inner table 411 has an outer circumferential surface which includes an outer circumferential surface of the base portion 4111 and an outer circumferential surface of the upper extension portion 4112. A plurality of axially spaced-apart annular bonding grooves 4113 (three bonding grooves in the present embodiment) is formed on the outer circumferential surface of the inner table 411.

Referring to FIG. 4A, the base portion 4111 and the upper extension portion 4112 are all formed into an annular shape. So are the bonding grooves 4113. In this regard, since the bonding grooves 4113 are arranged on the annular outer circumferential surface of the inner table 411, they can be formed with ease merely by rotating the inner table 411 about the center of the inner circumferential surface of the inner table 411 and pressing a cutting tool against the outer circumferential surface of the inner table 411. In particular, seeing that the inner table 411 is formed by cutting a brass piece, the step of forming the bonding grooves 4113 may be included in that cutting process. If the inner table 411 is formed by injection-molding a resin material through the use of a mold, it is necessary to perform an additional cutting step when forming the bonding grooves. This causes two steps to be performed, i.e., the molding step and the cutting step, thus making it difficult to form the bonding grooves. In contrast, if the bonding grooves 4113 are formed by cutting the inner table 411 which is also formed through a cutting step, it becomes possible to finish formation of the bonding grooves 4113 through a single cutting step. This makes it easy to form the bonding grooves 4113.

The base portion 4111 of the inner table 411 has an upper surface joined to an inner circumferential surface of the upper extension portion 4112.

The outer table 412 is formed into a generally "inverted L"-like half cross section by injection-molding polycarbonate as a resin material through the use of a mold. Referring to FIG. 5B, the outer table 412 has an inner circumferential surface of uniform annulus shape that makes contact with the outer circumferential surface of the inner table 411. Referring to FIG. 5A, the outer table 412 has an annular upper surface of uniform plane shape extending at a right angle relative to the center axis J1. The disk support part 46 is attached to an outer peripheral portion of upper surface of the outer table 412.

The cone part 42 is made of a resin material. The cone part 42 includes an annular sliding portion 421 having an inner circumferential surface axially slidable along the outer circumferential surface of the shaft 21, a first arm portion 422 continuously extending from the sliding portion 421 radially outwardly beyond an outer circumferential surface of the movement restricting part 44, a second arm portion 423 continuously extending from the first arm portion 422 axially upwardly, a guide portion 424 extending radially outwardly from the second arm portion 423 while slanting axially downwardly, a centering portion 425 extending radially outwardly from the guide portion 424 while slanting axially downwardly, and ribs 426 extending radially outwardly from the second arm portion 423 to connect with the guide portion 424 and the centering portion 425. In this regard, the ribs 426 are formed in plural numbers in a mutually spaced-apart relationship. Referring again to FIG. 2, the guide portion 424 and the centering portion 425 of the cone part 42 are formed into an annular shape.

Referring to FIG. 3, the resilient member 43 is a coil spring and is formed to have an axially downwardly increasing diameter. The resilient member 43 makes contact with the upper surface of the base portion 4111 and the inner circumferential surface of the upper extension portion 4112 of the inner table 411. This makes it possible to restrict axial downward movement and radial outward movement of the resilient member 43. The resilient member 43 remains in contact with the ribs 426 of the cone part 42, thereby biasing the cone part 42 axially upwardly.

The movement restricting part 44 is formed into a generally annular shape using a magnetic metal material. The movement restricting part 44 has an inner circumferential surface fixed to the outer circumferential surface of the shaft 21 and an outer circumferential surface arranged in a spaced-apart facing relationship with the inner circumferential surface of the second arm portion 423 of the cone part 42. The movement restricting part 44 has a lower surface formed in an axially facing relationship with the sliding portion 421 of the cone part 42. In a state that no disk is mounted on the disk support part 46 (hereinafter referred to as a "standby state"), the upper surface of the sliding portion 421 of the cone part 42 makes contact with the lower surface of the movement restricting part 44. The annular clamp magnet 45 is bonded by means of an adhesive agent on an upper surface of the movement restricting part 44.

Referring to FIG. 3, the outer circumferential surface of the inner table 411 and the inner circumferential surface of the outer table 412 are bonded together by means of an adhesive agent. In this connection, the bonding strength of the inner table 411 and the outer table 412 can be increased by forming the bonding grooves 4113 on the outer circumferential surface of the inner table 411. The outer circumferential surface of the inner table 411 can be made greater by providing the upper extension portion 4112 on the inner table 411, which makes it possible to increase the bonding area between the inner table 411 and the outer table 412. Therefore, it becomes possible to further increase the bonding strength of the inner table 411 and the outer table 412. This makes it possible to prevent the inner circumferential surface of the outer table 412 from being separated from the outer circumferential surface of the inner table 411, even when an axially downwardly acting force is imparted on the disk support part 46 of the outer table 412. As a consequence, it is possible to prevent deflection of the outer table 412 caused by an axial downward displacement of the disk support part 46, even if an axially downwardly acting force is applied to the disk support part 46 of the outer table 412. Accordingly, it becomes possible to provide a motor equipped with a highly reliable chucking device.

The upper surface of the upper extension portion 4112 of the inner table 411 is kept in an axially spaced-apart facing relationship with the lower surface of the centering portion 425 of the cone part 42. The outer circumferential surface of the upper extension portion 4112 (namely, the outer circumferential surface of the inner table 411) is positioned more radially outwardly than the outermost circumferential edge of the centering portion 425 of the cone part 42. Owing to the increase in the outer diameter of the inner table 411, the bonding position between the outer table 412 and the inner table 411 is shifted radially outwardly. This makes it possible to reduce the moment generated in the outer table 412 when a axially downwardly acting force is applied to the disk support part 46. Consequently, it is possible to prevent deformation of the outer table 412.

<Positional Relationship Between the Chucking Device and the Rotor Holder>

Figure 6:
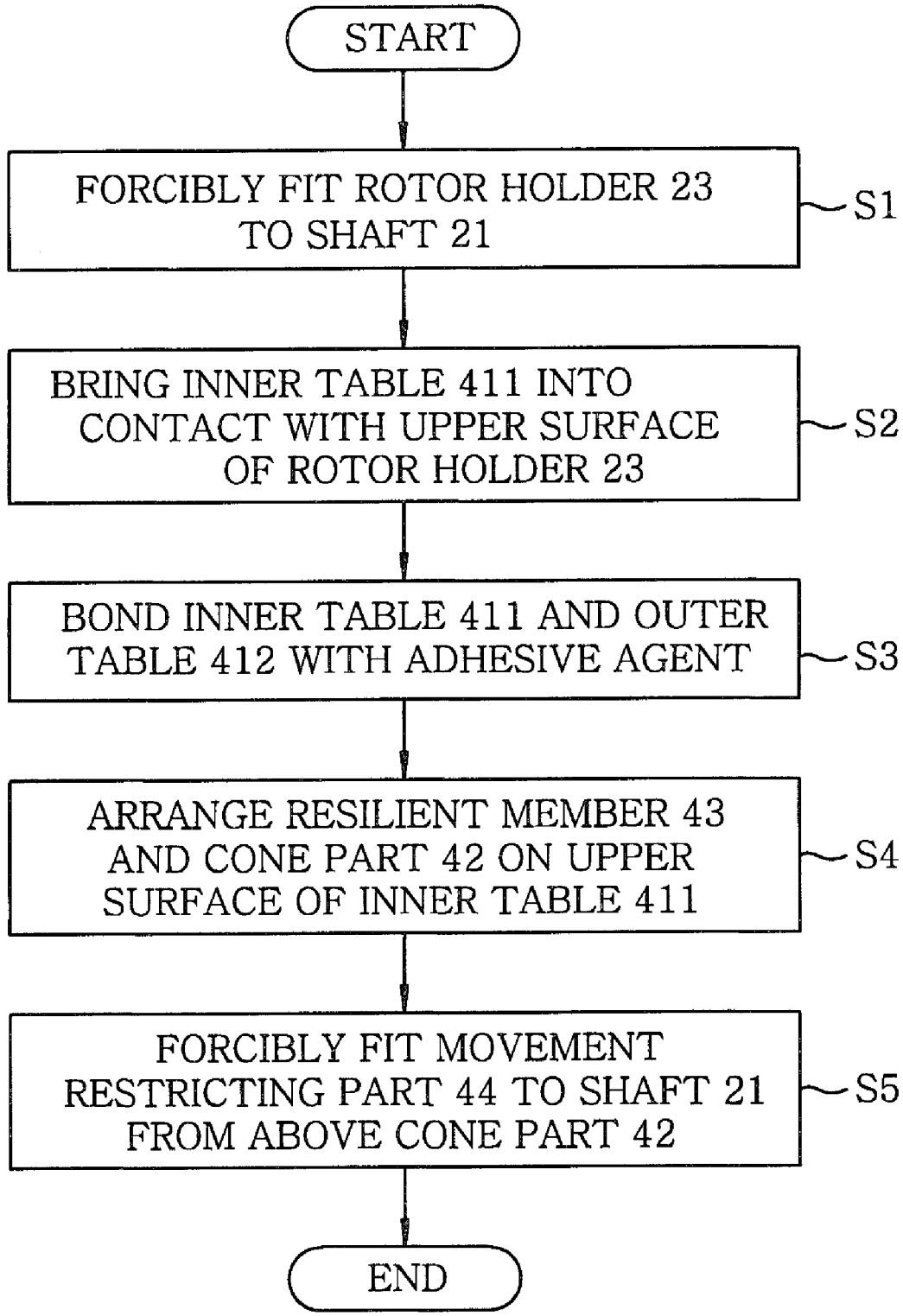
FIG. 6 is a flowchart illustrating a manufacturing process of a rotating body in accordance with the present invention.

Next, the positional relationship between the chucking device 40 and the rotor holder 23 will be described with reference to FIGS. 3 and 6. FIG. 6 is a flowchart illustrating a manufacturing process of the rotating body 20.

Referring to FIG. 3, the lower surface of the inner table 411 remains in contact with the upper surface of the cover portion 232 of the rotor holder 23. The lower surface region of the outer table 412 near the inner circumferential surface thereof faces the upper surface of the cover portion 232 of the rotor holder 23 with a small axial gap left therebetween.

Referring now to FIG. 6, the rotating body 20 is fabricated by first press-fitting the rotor holder 23, which carries the rotor magnet 22, onto the shaft 21 (step S1). Then, the inner table 411 is press-fitted onto the shaft 21 until the lower surface of the inner table 411 comes into contact with the upper surface of the cover portion 232 of the rotor holder 23 (step S2). This makes it possible to axially position the inner table 411 in an easy and accurate manner. Thereafter, the outer table 412 is bonded to the inner table 411 by means of an adhesive agent (step S3). In this regard, since the outer table 412 is axially spaced apart from the rotor holder 23, the outer table 412 can be axially positioned with respect to the shaft 21 regardless of the accuracy in the axial assembly position of the rotor holder 23 relative to the shaft 21. Therefore, it is possible to attach the outer table 412 to the inner table 411 with increased axial positioning accuracy. Particularly, in the present embodiment, by using the lower end surface of the shaft 21 as a reference position, axial positions of the upper surface of the cover portion 232 of the rotor holder 23 and the upper surface of the disk support part 46 are determined.

Next, the resilient member 43 is arranged on the upper surface of the inner table 411 and the cone part 42 is disposed above the resilient member 43 (step S4 in FIG. 6). In a state that the resilient member 43 is axially downwardly compressed by displacing the cone part 42 axially downwardly, the movement restricting part 44 to which the clamp magnet 45 is bonded beforehand by means of an adhesive agent is press-fitted onto the shaft 21 (step S5). The movement restricting part 44 is also axially positioned by using the lower end surface of the shaft 21 as a reference position.

The adhesive agent used in bonding the inner table 411 and the outer table 412 together may be filled into the gap between the lower surface of the outer table 412 and the upper surface of the cover portion 232 of the rotor holder 23. This phenomenon occurs because the adhesive agent is partly moved in an axial downward direction when applying the adhesive agent to the inner table 411 in advance and then fitting the outer table 412 onto the inner table 411 from the axial upper side of the latter. If the adhesive agent is filled into the gap between the lower surface of the outer table 412 and the upper surface of the cover portion 232 of the rotor holder 23, the outer table 412 is also bonded to the rotor holder 23 by means of the adhesive agent. This further increases the bonding strength of the outer table 412. Therefore, it is possible to prevent the disk support part 46 from moving axially downwardly even when an axially downwardly acting force is imparted on the disk support part 46 of the outer table 412. As a result, it becomes possible to provide a motor equipped with a chucking device in which the outer table 412 is kept free from deflection even when an axially downwardly acting force is applied to the disk support part 46.

<Comparison with a Conventional Motor>

Figure 7:
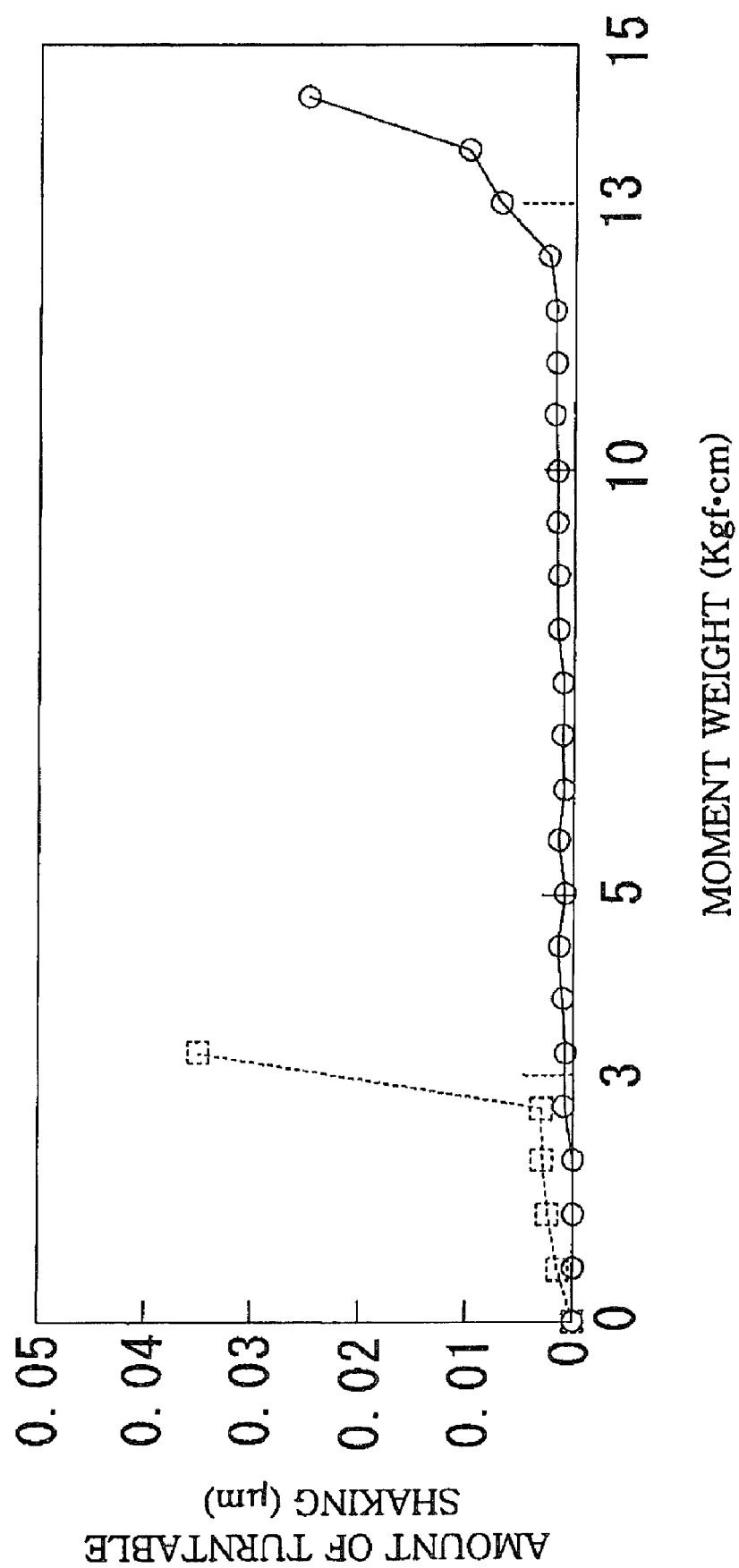
FIG. 7 is a graph plotting the deflection amount of a turntable part when a force is applied to a disk support surface in an axial direction.

Referring next to FIG. 7, description will be offered regarding the changes in the force that triggers deflection of the turntable part when an axially downwardly acting force is applied to the disk support parts of the conventional motor having a turntable part made of only a resin material (hereinafter simply called a "conventional motor") and the motor of the present invention with a turntable part having a metal-made inner table and a resin-made outer table (hereinafter simply called a "present motor"). In FIG. 7, the horizontal axis represents an axially downwardly acting force applied to the disk support part (a moment load in terms of kgf·cm) and the vertical axis represents a deflection amount (μm) of the turntable part. In this graph, the solid line indicates the values of the present motor and the dotted line indicates the values of the conventional motor.

As can be seen in FIG. 7, the deflection amount of the turntable part in the conventional motor is sharply increased when the moment load is about 3 kgf·cm. In contrast, the deflection amount of the turntable part in the present motor is kept nearly zero until the moment load reaches about 13 kgf·cm. Therefore, the disk support part of the present motor is able to bear an axially downwardly acting force (a moment load) about 10 kgf·cm greater than that bearable by the conventional motor. As a result, it is possible to provide a highly reliable motor capable of preventing an increase in the deflection amount of the turntable part even when an axially downwardly acting force is applied to the disk support part in the process of mounting the motor within a disk driving apparatus.

Another Embodiment

Figure 8:
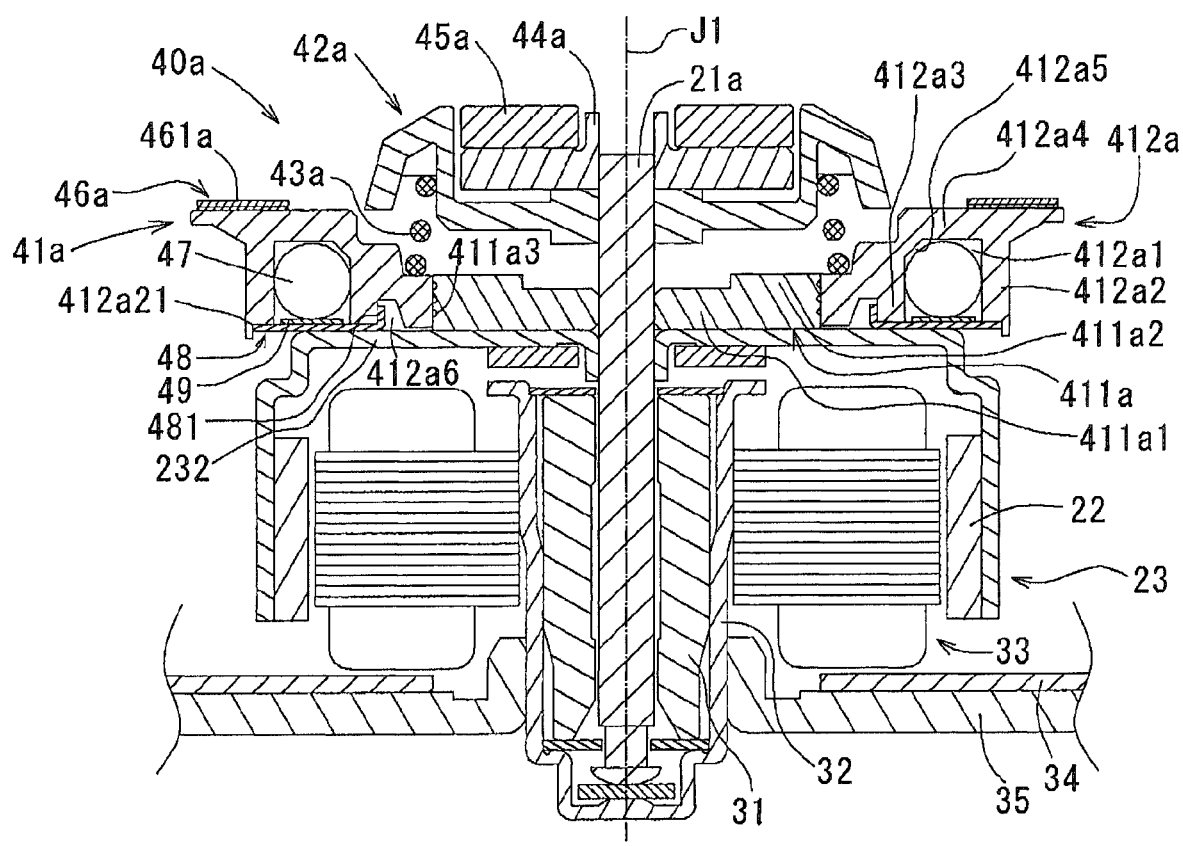
FIG. 8 is an axially-cut schematic section view showing a motor in accordance with another embodiment of the present invention.
Figure 9A:
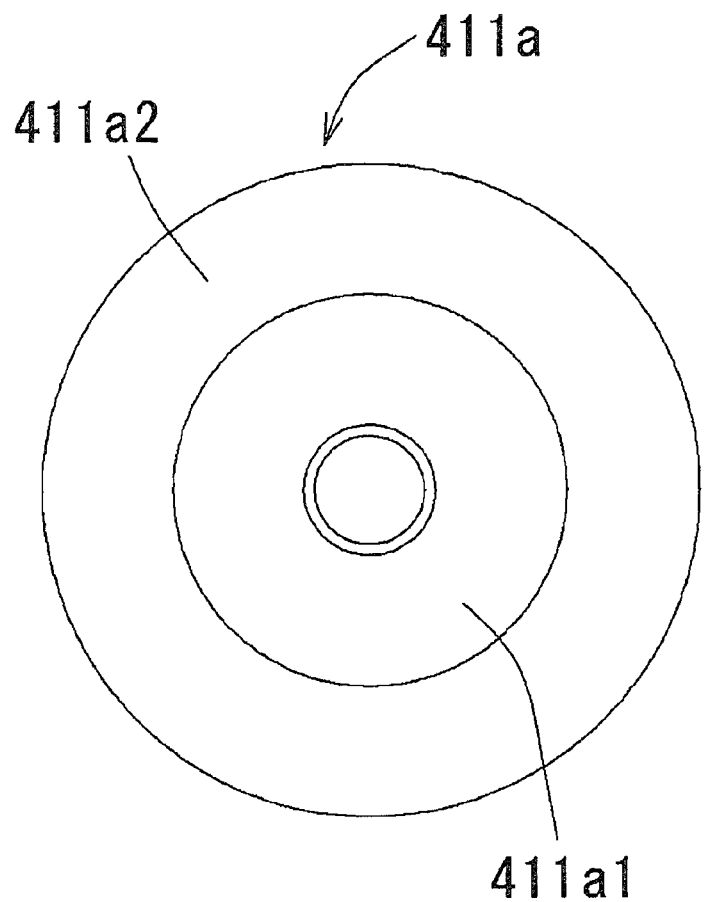
FIG. 9A is a top plan view illustrating an inner table of the motor in accordance with another embodiment of the present invention and FIG. 9B is an axially-cut schematic section view showing the inner table.
Figure 9B:
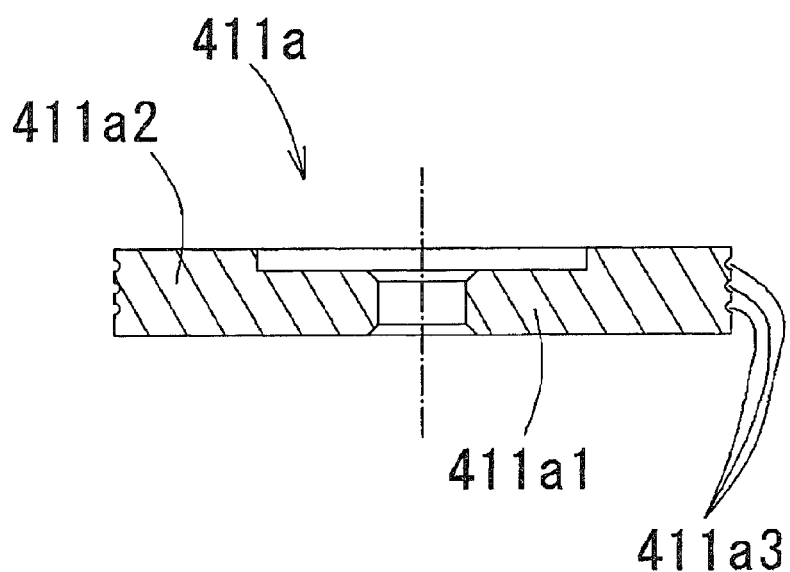
Figure 10A:
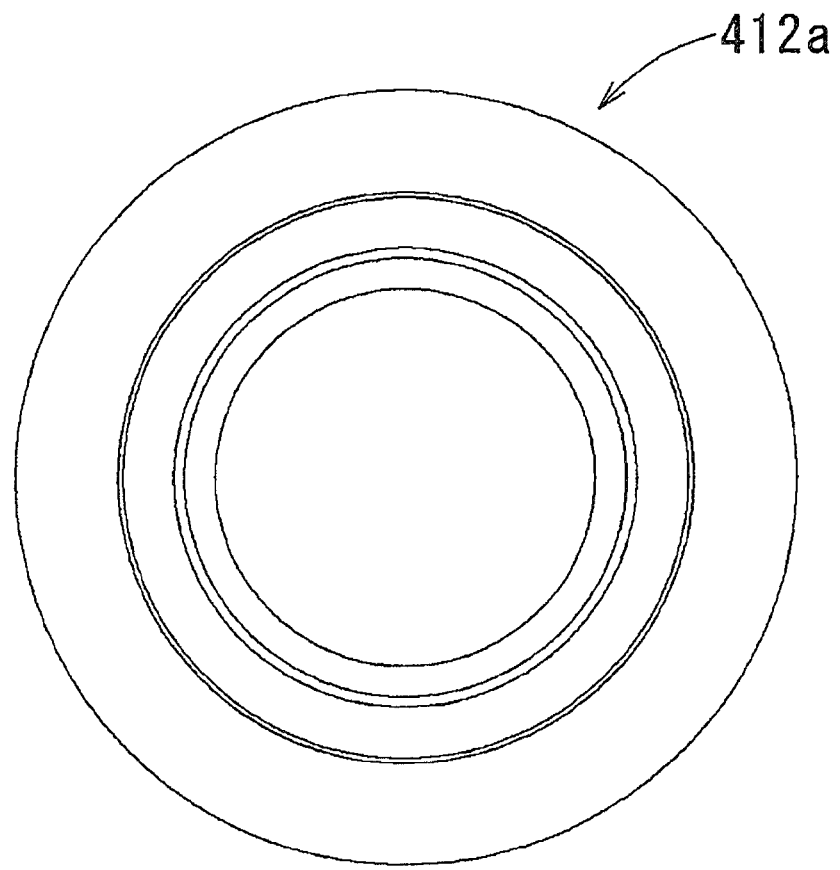
FIG. 10A is a top plan view illustrating an outer table of the motor in accordance with another embodiment of the present invention and FIG. 10B is an axially-cut schematic section view showing the outer table.
Figure 10B:
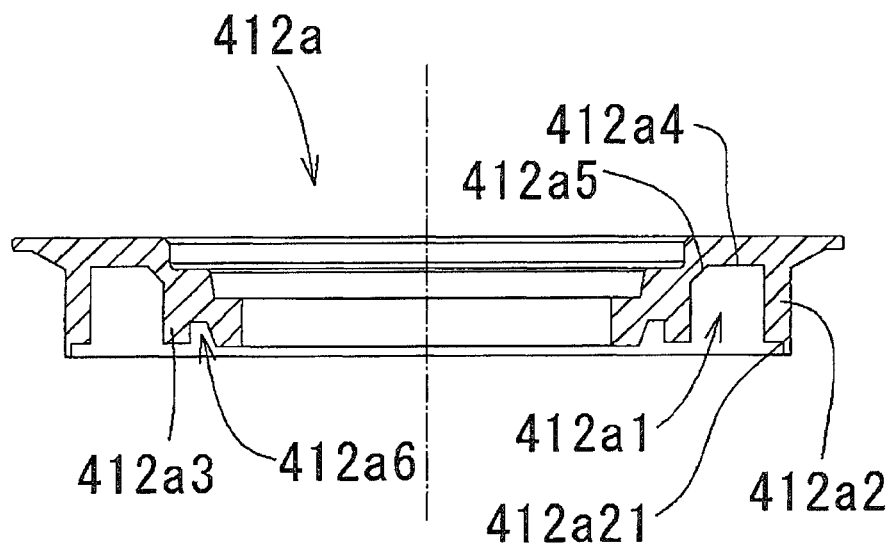

Another embodiment of the present motor will be described with reference to FIGS. 8 to 10. FIG. 8 is an axially-cut schematic section view showing a motor in accordance with another embodiment of the present invention. The embodiment shown in FIG. 8 differs from the embodiment illustrated in FIG. 1 in that the chucking device and the shaft are changed in length. Other components that remain unchanged will be designated by the same reference numerals as used in FIG. 1, and redundant descriptions thereof will be omitted. FIG. 9A is a top plan view illustrating an inner table and FIG. 9B is an axially-cut schematic section view of the inner table. FIG. 10A is a top plan view illustrating an outer table and FIG. 10B is an axially-cut schematic section view of the outer table.

Referring to FIG. 8, a chucking device 40a includes a turntable part 41a having a disk support surface 461a that makes contact with the lower surface of a disk, an axially movable cone part 42a for bringing the center of the disk into alignment with the center axis J1, a resilient member 43a for axially upwardly biasing the cone part 42a, a movement restricting part 44a for restricting axial upward movement of the cone part 42a by making contact with the latter, a clamp magnet 45a fixed to an upper surface of the movement restricting part 44a, a plurality of steel balls 47 received within an annular groove portion formed in the turntable part 41a for correcting an unbalance of the rotating body, and an annular sealing plate 48 for covering the annular groove portion. A disk support part 46a is fixed to an upper surface of the turntable part 41a of the chucking device 40a and has at the top thereof the disk support surface 461a with which the lower surface of the disk makes contact.

The turntable part 41a includes an inner table 411a made of a metal and fixed to a shaft 21a by press-fitting and an outer table 412a made of a resin material and fixed to a radial outward side of the inner table 411a.

The inner table 411a is formed by cutting a brass piece as a metal into a generally "cup"-like cross section with an opening at the center of the bottom. Referring to FIG. 9B, the inner table 411a is provided with an inner circumferential surface fixed to the outer circumferential surface of the shaft 21a by a press-fitting method, a base portion 411a1 extending radially outwardly from the inner circumferential surface, and an upper extension portion 411a2 extending axially upwardly from the base portion 411a1. The inner table 411a has an outer circumferential surface which includes an outer circumferential surface of the base portion 411a1 and an outer circumferential surface of the upper extension portion 411a2. A plurality of axially spaced-apart annular bonding grooves 411a3 (three bonding grooves in the present embodiment) is formed in the outer circumferential surface of the inner table 411a.

Referring again to FIG. 9A, the base portion 411a1 and the upper extension portion 411a2 are all formed into an annular shape. So are the bonding grooves 411a3. In this regard, since the bonding grooves 411a3 are arranged on the annular outer circumferential surface of the inner table 411a, they can be formed with ease merely by rotating the inner table 411a about the center of the inner circumferential surface of the inner table 411a and pressing a cutting tool against the outer circumferential surface of the inner table 411a. In particular, seeing that the inner table 411a is formed by cutting a brass piece, the step of forming the bonding grooves 411a3 may be included in that cutting process. If the inner table 411a is formed by injection-molding a resin material through the use of a mold, it is necessary to perform an additional cutting step when forming the bonding grooves. This causes two steps to be performed, i.e., the molding step and the cutting step, thus making it difficult to form the bonding grooves. In contrast, if the bonding grooves 411a3 are formed by cutting the inner table 411a which is also formed through a cutting step, it becomes possible to finish formation of the bonding grooves 411a3 through a single cutting step. This makes it easy to form the bonding grooves 411a3.

The base portion 411a1 of the inner table 411a has an upper surface joined to an inner circumferential surface of the upper extension portion 411a2.

The outer table 412a is formed by injection-molding polycarbonate as a resin material through the use of a mold. Referring to FIG. 10B, the outer table 412a has an inner circumferential surface of uniform annulus shape that makes contact with the outer circumferential surface of the inner table 411a. Referring to FIG. 10A, the outer table 412a has an annular upper surface of uniform plane shape extending at a right angle relative to the center axis J1. The disk support part 46a is attached to an outer peripheral portion of the upper surface of the outer table 412a.

An axially downwardly opened annular groove portion 412a1 is formed in the outer table 412a. The annular groove portion 412a1 is defined by an annular outer wall 412a2 constituting an outer circumferential surface of the annular groove portion 412a1, an annular inner wall 412a3 constituting an inner circumferential surface of the annular groove portion 412a1, and an annular upper wall 412a4 interconnecting the annular outer wall 412a2 and the annular inner wall 412a3. An inclined surface 412a5 extending radially outwardly and axially upwardly is formed in the juncture of the annular inner wall 412a3 and the annular upper wall 412a4. By performing injection molding, the outer table 412a can be easily formed into a complex shape having the annular groove portion 412a1.

An annular inner groove portion 412a6 having a size smaller than that of the annular groove portion 412a1 is formed radially inwardly of the annular groove portion 412a1. The annular groove portion 412a1 and the annular inner groove portion 412a6 are all formed into an annular shape whose center coincides with the center axis J1. The annular inner groove portion 412a6 has an outer circumferential surface that includes the inner circumferential surface of the annular inner wall 412a3.

A step portion 412a21 is formed on the radial inward side of a lower portion of the annular outer wall 412a2. The sealing plate 48 of annular shape makes contact with the step portion 412a21 at its peripheral edge.

Referring again to FIG. 8, the sealing plate 48 makes contact with the annular outer wall 412a2 and the annular inner wall 412a3 to thereby cover the annular groove portion 412a1. A spacer 49 as an annular sheet remains in contact with an upper surface of the sealing plate 48. The plurality of steel balls 47 is disposed within the annular groove portion 412a1 so that they can make contact with an upper surface of the spacer 49.

The sealing plate 48 is formed into a generally annular shape by press-forming a metal plate. An inner circumferential wall 481 of annular shape is integrally formed with an inner circumference of the sealing plate 48. The inner circumferential wall 481 has an outer circumferential surface fixed to the inner circumferential surface of the annular inner wall 412a3 by a press-fitting method. The sealing plate 48 has a lower surface that makes contact with the upper surface of the cover portion 232 of the rotor holder 23.

The outer circumferential surface of the inner table 411a and the inner circumferential surface of the outer table 412a are bonded together by means of an adhesive agent. In this connection, the bonding strength of the inner table 411a and the outer table 412a can be increased by forming the bonding grooves 411a3 in the outer circumferential surface of the inner table 411a. The outer circumferential surface of the inner table 411a can be made greater by providing the upper extension portion 411a2 on the inner table 411a, which makes it possible to increase the bonding area between the inner table 411a and the outer table 412a. Therefore, it becomes possible to further increase the bonding strength of the inner table 411a and the outer table 412a. This makes it possible to prevent the inner circumferential surface of the outer table 412a from being separated from the outer circumferential surface of the inner table 411a, even when an axially downwardly acting force is imparted on the disk support part 46a of the outer table 412a. As a consequence, it is possible to prevent deflection of the outer table 412 caused by an axial downward displacement of the disk support part 46a, even if an axially downwardly acting force is applied to the disk support part 46a. Accordingly, it becomes possible to provide a motor equipped with a highly reliable chucking device.

A small gap is formed between the lower surface region of the outer table 412a lying radially inwardly from the annular inner groove portion 412a6 and the upper surface of the cover portion 232 of the rotor holder 23. Therefore, when the adhesive agent existing between the outer circumferential surface of the inner table 411a and the inner circumferential surface of the outer table 412a overflows downwardly (i.e., toward the upper surface of the cover portion 232 of the rotor holder 23), the gap can receive the overflowing adhesive agent. If the adhesive agent is filled into the gap, the lower surface region of the outer table 412a lying radially inwardly from the annular inner groove portion 412a6 is bonded to the upper surface of the cover portion 232 of the rotor holder 23 by means of the adhesive agent. Thus, the outer table 412a is also fixed to the rotor holder 23. Consequently, it is possible to prevent deflection of the outer table 412a caused by an axial downward displacement of the disk support part 46a, even if an axially downwardly acting force is applied to the disk support part 46a.

<Disk Driving Apparatus>

Next, one embodiment of a disk driving apparatus equipped with the present motor will be described with reference to FIG. 11, which is an axially-cut schematic section view of the disk driving apparatus.

Figure 11:
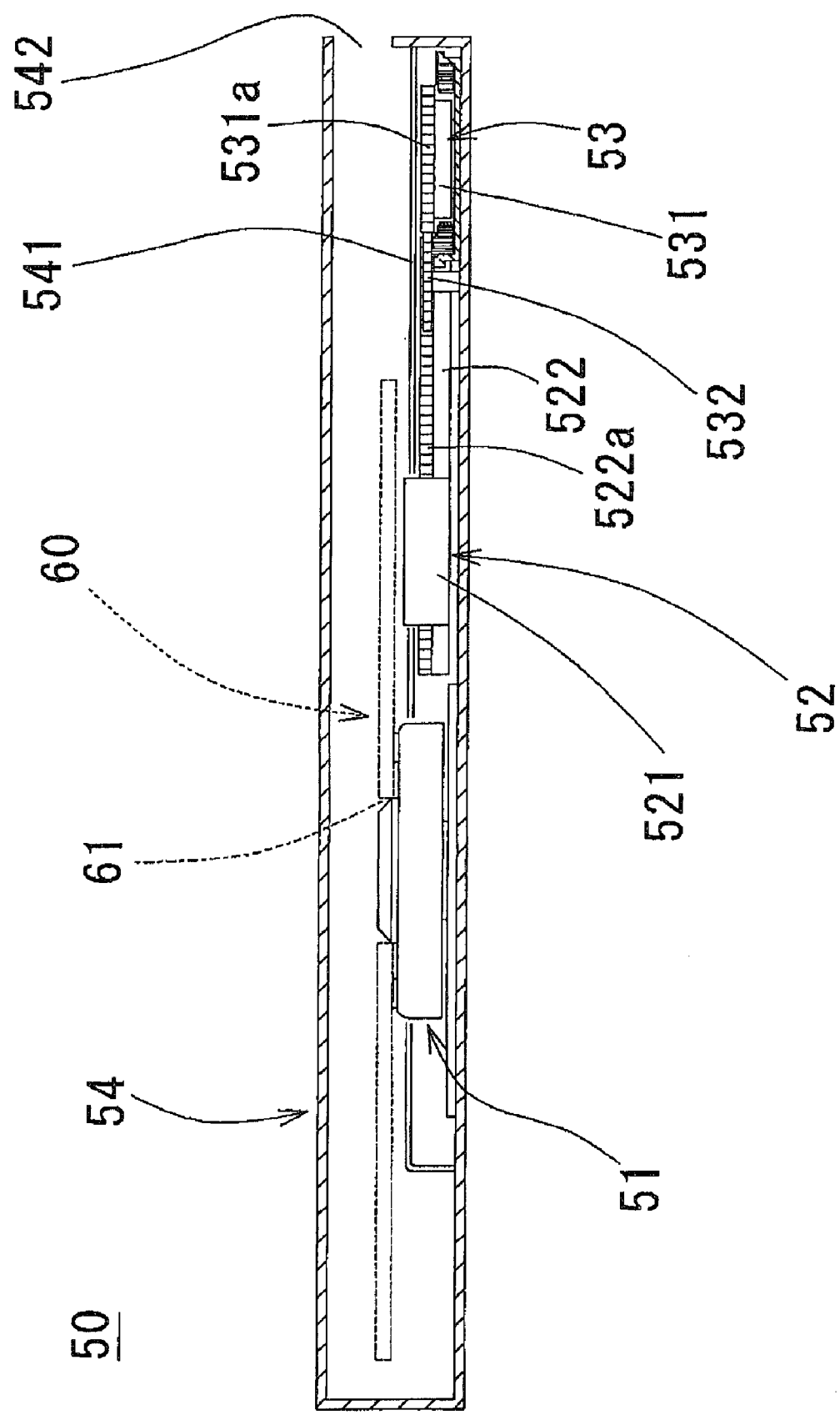
FIG. 11 is an axially-cut schematic section view showing a disk driving apparatus in accordance with one embodiment of the present invention.
Figure 12:
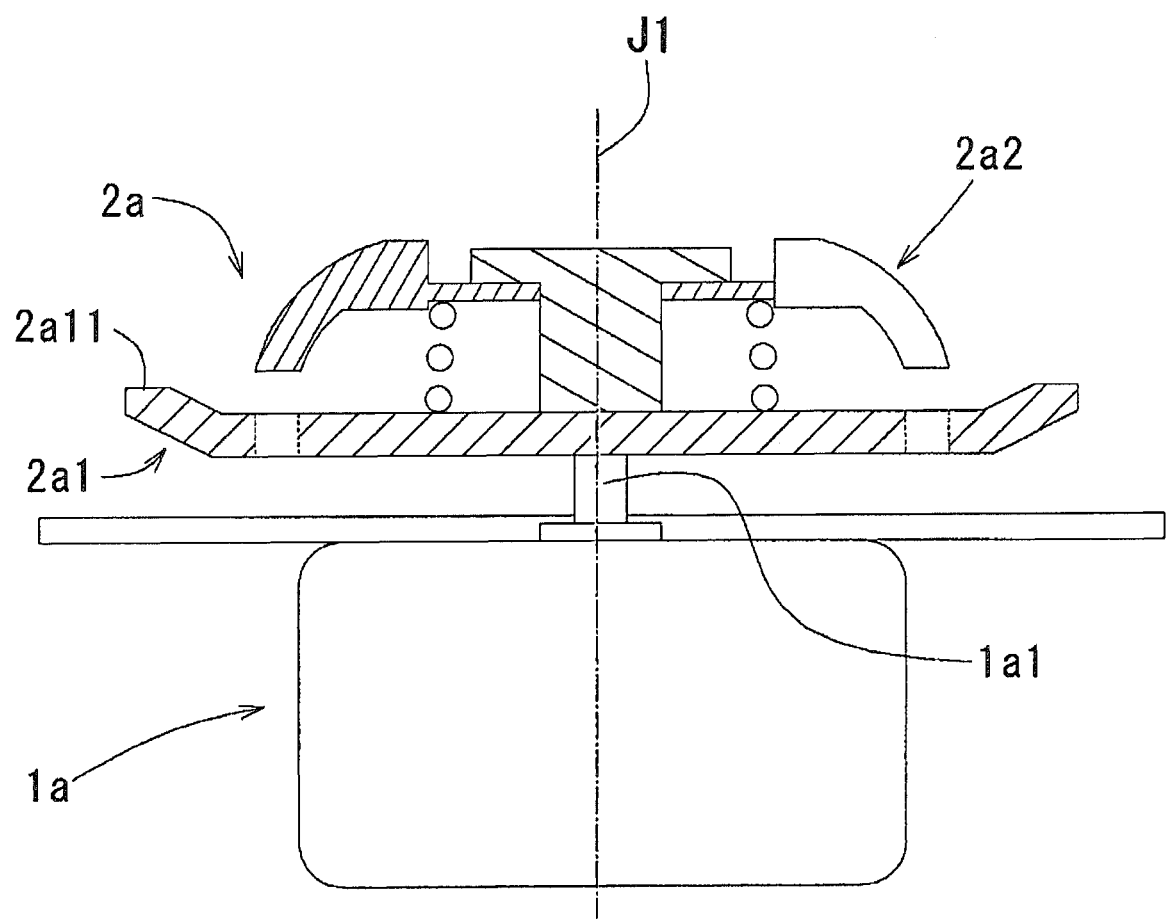
FIG. 12 is an axially-cut schematic section view showing a conventional motor.

Referring to FIG. 11, the disk driving apparatus 50 includes a spindle motor 51 for rotating a disk 60 having an opening 61 at its center, the motor 51 being inserted into the opening 61 of the disk 60 to bring the center of the opening 61 into coaxial alignment with the rotational axis of the disk 60, a pickup mechanism 52 for recording information on and/or reproducing information from the disk 60 by irradiating a laser beam toward the disk 60, a gear mechanism 53 for moving the pickup mechanism 52 in a radial direction of the disk 60, and a case 54 for receiving the spindle motor 51, the pickup mechanism 52 and the gear mechanism 53. A clamp member (not shown) is used to press an upper surface of the disk 60, thereby keeping the disk 60 in place.

The gear mechanism 53 includes a motor 531, which has an output shaft and a driving gear attached to the output shaft, and a driven gear 532 for receiving a torque of the motor 531.

A thin partition plate 541 for isolating moving section of the disk 60 and the gear mechanism 53 is provided within the case 54. Furthermore, the case 54 has an access opening 542 through which the disk 60 is inserted and taken out.

The pickup mechanism 52 includes a recording and reproducing unit 521 for irradiating a laser beam and a moving unit 522 for moving the recording and reproducing unit 521, the moving unit 522 being provided perpendicularly to the moving direction of the recording and reproducing unit 521 that moves along the radial direction of the disk 60. The moving unit 522 has a meshing portion 522a that comes into meshing engagement with the driven gear 532. The recording and reproducing unit 521 is meshed with the moving unit 522 and consequently moved in the radial direction.

The driven gear 532 is rotated by coming into meshing engagement with a gear portion 531a attached to the motor 531. The moving unit 522 is moved in the radial direction because the driven gear 532 remains meshed with the meshing portion 522a of the moving unit 522. Upon movement of the moving unit 522, the recording and reproducing unit 521 is moved in the radial direction.

With applying the present motor 10 to the spindle motor 51 of the disk driving apparatus 50, an increase in the deflection amount of the turntable part (not shown) can be prevented even when an axially downwardly acting force is applied to the disk support part (not shown) of the spindle motor 51 in the process of mounting the spindle motor 51 within the disk driving apparatus 50. Accordingly, it becomes possible to provide a highly reliable disk driving apparatus capable of preventing generation of recording and reproducing errors which would otherwise be generated when the disk 60 is driven by the spindle motor 51.

While certain embodiments of the present invention have been described hereinabove, the present invention is not limited to these embodiments. Many changes or modifications may be made without departing from the scope of the claims.

As an example, although brass is used in the foregoing embodiments as the metal of the inner table 411, 411a, the present invention is not limited thereto. The inner table 411, 411a may be made of other materials with increased cutability. Furthermore, although polycarbonate is used as the resin material of the outer table 412, 412a, the present invention is not limited thereto.

In addition, although the chucking device 40, 40a is of a structure having the axially slidable cone part 42 or 42a in the foregoing embodiments, the present invention is not limited thereto.

Furthermore, although the chucking device 40 of the motor 10 includes the turntable 41, the corn part 42, the resilient member 43, the movement restricting part 44, the clamp magnet 45, and the disk support part 46 in the foregoing embodiments, the present invention is not limited thereto. For example, the chucking device may includes a turntable having a disk support surface which mounts a disk thereon and a centering case portion having a centering surface which brings the center of the central opening of the disk into alignment with the center axis. The same manner can be applied to the chucking device 40a.

Further, even if the chucking device 40 includes the clamp magnet 45 to magnetically attract the clamp member (not shown), the present invention is not limited thereto. For example, the chucking device 40 may not include the clamp magnet 45 if the clamp member is provided with a magnet. The same manner can be applied to the chucking device 40a.

Moreover, although, in the chucking device 40 of the motor 10, the inner table 411 and the outer table 412 of the turntable 41 are bonded to each other with adhesive in the foregoing embodiments, the present invention is not limited thereto. For example, the inner table and the outer table may be integrally formed by injection molding the inner table. In this case, grooves are formed in the outer circumferential surface of the inner table so that bonding strength between the inner table and the outer table can be improved. The same manner can be applied to the chucking device 40a.

Further, though the outer circumferential surface of the inner table 411 in the chucking device 40 of the motor 10 is a circular ring-shape as seen from the top, the present invention is not limited thereto. For example, the outer circumferential surface of the inner table may be formed as a polygonal shape as seen from the top. In this case, the inner circumferential surface of the outer table fixed to the inner table is formed as a polygonal shape correspondingly.

Also, though the inner table 411 in the chucking device 40 of the motor 10 comes in contact with the cover portion 232 of the rotor holder 23, the present invention is not limited thereto. For example, the inner table 411 may be bonded to the cover portion 232 of the rotor holder 23 with adhesive.

Additionally, though the inner table 411 in the chucking device 40 of the motor 10 is fixed to the shaft 21, the present invention is not limited thereto. For example, if the shaft-fixed portion of the rotor holder is extended axially upwardly from the cover portion, the inner table may be fixed to the outer circumferential surface of the shaft-fixed portion.

Lastly, though the chucking device 40a in the foregoing embodiment includes the annular sealing plate 48, the present invention is not limited thereto. For example, instead of using the annular sealing plate 48, the cover portion of the rotor holder may be used to seal the annular groove portion of the outer table.

While the invention has been shown and described with respect to the embodiments, it will be understood by those skilled in the art that various changes and modification may be made without departing from the scope of the invention as defined in the following claims.

What is claimed is:

1. A motor comprising:
a chucking device arranged to hold a disk having a central opening in a detachable manner;
a shaft centered on a center axis;
a rotor magnet rotatable about the center axis;
a rotor holder fixed to the shaft and arranged to hold the rotor magnet; and
a stator arranged inside the rotor holder opposite to the rotor magnet,
wherein the chucking device includes: a turntable part arranged above the rotor holder, the turntable part having a disk support surface arranged to support the disk;
an axially slidable cone part arranged above the turntable part, the cone part having an annular centering surface which slants axially downwardly and radially outwardly and brings a center of the central opening of the disk into alignment with the center axis; a resilient member axially arranged between the turntable part and the cone part to upwardly bias the cone part; and a movement restricting part arranged above the cone part arranged to restrict upward movement of the cone part, wherein the turntable part includes an inner table made of a metal and fixed to the shaft, and an outer table made of a resin material and outside of the inner table, the outer table having the disk support surface, and wherein the outer table is spaced apart from the rotor holder in a position where the inner table and the outer table are fixed to each other.

2. The motor of claim 1, wherein the rotor holder includes a shaft-fixed portion fixed to the shaft and a cover portion extending radially outwardly from the shaft-fixed portion, the inner table in contact with an upper surface of the cover portion.

3. The motor of claim 1, wherein the inner table and the outer table are bonded to each other with an adhesive.

4. The motor of claim 3, wherein at least one annular bonding groove is formed in the outer circumferential surface of the inner table to which the outer table is fixed.

5. The motor of claim 1, wherein the inner table is made of brass.

6. The motor of claim 1, wherein the outer table and the rotor holder are bonded to each other with the adhesive arranged therebetween.

7. The motor of claim 1, wherein the inner table is provided at its outer peripheral portion with an upper extension portion extending axially upwardly from the upper surface of the inner table, the upper extension portion including an outer side of the inner table.

8. The motor of claim 7, wherein the resilient member makes contact with the upper surface of the inner table and an inner side surface of the upper extension portion.

9. The motor of claim 1, wherein a distance of an outermost portion of the inner table from the center axis is greater than a largest distance of an outermost portion of the cone part from the center axis, and an upper surface of an outer peripheral portion of the inner table is axially opposed to a lower surface of the cone part.

10. The motor of claim 7, wherein the inner table is formed by cutting, the upper surface of the upper extension portion of the inner table is positioned axially downwardly of the upper surface of the outer table.

11. A disk driving apparatus for performing at least one of recording information on and reproducing information from a disk in an optical manner, comprising:
the motor recited in claim 1;
a recording and reproducing unit arranged radially outwardly of the motor and movable in a radial direction substantially perpendicular to the center axis; and
a moving mechanism arranged to move the recording and reproducing unit.

12. A method for manufacturing the motor recited in claim 1, comprising:
fixing the rotor holder and the inner table onto the shaft; and
subsequently fixing the outer table to the inner table.

13. The method of claim 12, wherein the inner table and the outer table are bonded to each other with an adhesive, a part of the adhesive agent being present between the outer table and the rotor holder.

14. A motor comprising:
a chucking device arranged to hold a disk having a central opening in a detachable manner;
a shaft centered on a center axis;
a rotor magnet rotatable about the center axis;
a rotor holder fixed to the shaft arranged to hold the rotor magnet;
a stator arranged inside the rotor holder opposite to the rotor magnet; and
an automatic balancing device provided between the chucking device and the rotor holder for automatically correcting a rotating balance of the motor,
wherein the chucking device includes: a turntable part arranged above the rotor holder, the turntable part having a disk support surface arranged to support the disk; an axially slidable cone part arranged above the turntable part, the cone part having an annular centering surface which slants axially downwardly and radially outwardly and brings a center of the central opening of the disk into alignment with the center axis; a resilient member axially arranged between the turntable part and the cone part to upwardly bias the cone part; and a movement restricting part arranged above the cone part arranged to restrict upward movement of the cone part,
wherein the turntable part includes an inner table made of a metal and fixed to the shaft, and an outer table made of a resin material and fixed to an outside of the inner table, the outer table having the disk support surface and an axially downwardly opened annular groove portion formed in an outer peripheral portion thereof,
wherein the automatic balancing device includes an annular space surrounded by the annular groove portion of the outer table and the upper surface of the rotor holder and a plurality of balancing members received within the annular space, and
wherein the outer table is axially spaced apart from the rotor holder in a position where the inner table and the outer table are fixed to each other.

15. The motor of claim 14, wherein a metal-made annular plate for closing the annular groove portion is attached to the annular groove portion of the outer table to define the annular space and wherein a resin-made annular sheet with which the plurality of balancing members makes contact is attached to an upper surface of the annular plate.

16. The motor of claim 14, wherein the inner table and the outer table are bonded to each other with an adhesive.

17. The motor of claim 16, wherein at least one annular bonding groove is formed in the outer circumferential surface of the inner table to which the outer table is fixed.

18. The motor of claim 11, wherein an adhesive agent is present on at least a part of the lower surface of the outer table extending radially between the inner circumferential surface of the outer table fixed to the inner table and the annular groove portion, the part of the lower surface of the outer table being fixed to the upper surface of the rotor holder by means of the adhesive agent.

19. The motor of claim 14, wherein the inner table is provided at its outer peripheral portion with an upper extension portion extending axially upwardly from the upper surface of the inner table, the upper extension portion including the outer circumferential surface of the inner table.

20. A motor comprising:
a chucking device arranged to hold a disk having a central opening in a detachable manner;
a shaft centered on a center axis;
a rotor magnet rotatable about the center axis;

a rotor holder fixed to the shaft arranged to hold the rotor magnet; and a stator arranged inside the rotor holder opposite to the rotor magnet, wherein the chucking device includes: a centering case portion having a centering surface for bringing a center of the central opening of the disk into alignment with the center axis; and a turntable part having a disk support surface formed radially outwardly of the centering surface so that a lower surface of the disk can make contact with the disk support surface, wherein the turntable part includes an inner table fixed to the shaft and an outer table fixed to the inner table, the outer table having the disk support surface, and wherein the outer table is spaced apart from the rotor holder in a position where the inner table and the outer table are fixed to each other.

* * * * *